United States Patent [19]

Downs et al.

[11] Patent Number: 4,653,351
[45] Date of Patent: Mar. 31, 1987

[54] CLUTCH-TO-CLUTCH POWER-ON DOWNSHIFTING IN A MOTOR VEHICLE AUTOMATIC TRANSMISSION

[75] Inventors: Robert C. Downs, Ortonville; Larry T. Nitz, Troy, both of Mich.

[73] Assignee: General Motors Corporation, Detroit, Mich.

[21] Appl. No.: 828,861

[22] Filed: Feb. 12, 1986

[51] Int. Cl.⁴ .................. B60K 41/18; B60K 41/16
[52] U.S. Cl. ............................... 74/866; 74/869
[58] Field of Search .................... 74/869, 868, 866

[56] References Cited

U.S. PATENT DOCUMENTS

| | | | |
|---|---|---|---|
| 3,656,373 | 4/1972 | Shimosaki | 74/869 |
| 3,688,608 | 9/1972 | Leach | 74/869 |
| 3,752,011 | 8/1973 | Casey et al. | 74/866 X |
| 3,855,880 | 12/1974 | Ishimaru et al. | 74/866 X |
| 4,034,627 | 7/1977 | Mizote | 74/866 |
| 4,422,350 | 12/1983 | Myller et al. | 74/866 X |
| 4,476,747 | 10/1984 | Kawamoto | 74/869 |
| 4,497,222 | 2/1985 | Nagaoka et al. | 74/869 X |

FOREIGN PATENT DOCUMENTS 0047517 3/1982 European Pat. Off. .............. 74/866

Primary Examiner—Leslie Braun
Assistant Examiner—Dirk Wright
Attorney, Agent, or Firm—Mark A. Navarre

[57] ABSTRACT

A clutch-to-clutch power-on downshift in a motor vehicle automatic transmission is effected by reducing the torque capacity of the off-going clutching device to permit the transmission input speed to increase toward a target speed which it will finally attain subsequent to the shift; increasing the torque capacity of the off-going clutching device and preparing the on-coming clutching device when the input speed approaches its target speed so that the input speed is held near the target speed by the time the on-coming clutching device is prepared to transmit torque; and concurrently applying and releasing the on-coming and off-going clutching device to complete the shift. Since the input speed is substantially at its target value when the exchange of clutching devices occurs, a high quality shift with minimal driveline torque disruption results.

12 Claims, 18 Drawing Figures

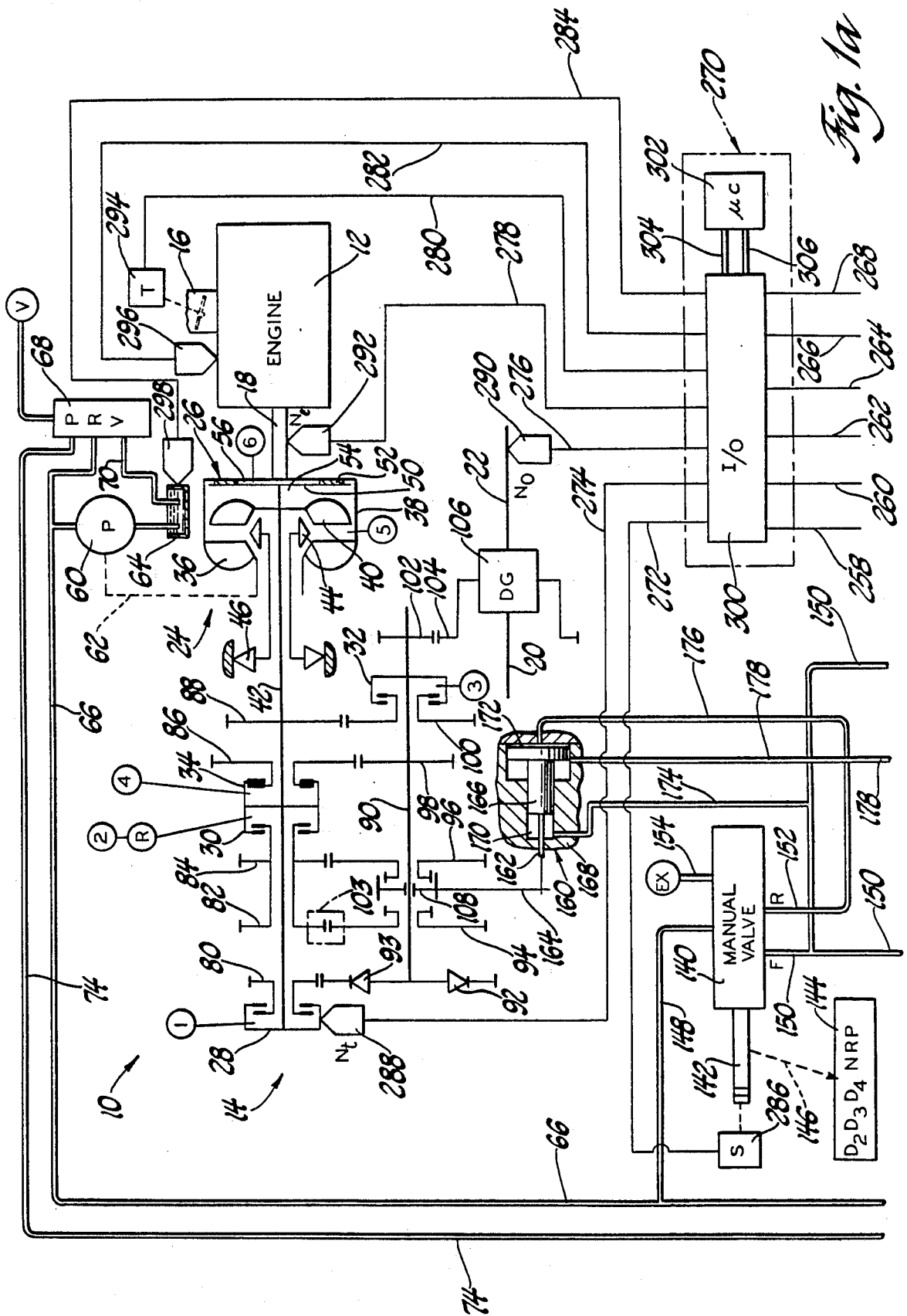

CLUTCH-TO-CLUTCH POWER-ON DOWNSHIFTING IN A MOTOR VEHICLE AUTOMATIC TRANSMISSION

This invention relates to clutch-to-clutch speed ratio control in a motor vehicle automatic transmission, and more particularly to a system for effecting ratio downshifts when the vehicle is being operated in a positive torque or power-on mode.

BACKGROUND OF THE INVENTION

Generally, a motor vehicle automatic transmission includes a number of gear elements coupling its input and output shafts, and a related number of torque establishing devices such as clutches and brakes which are selectively engageable to activate certain gear elements for establishing a desired speed ratio between the input and output shafts.

The brake can be of the band type or disk type; engineering personnel in the automotive art refer to disc type brakes in transmissions as "clutches" or "reaction clutches". The input shaft is connected to the vehicle engine through a fluid coupling such as a torque converter, and the output shaft is connected directly to the vehicle wheels. Shifting from one forward speed ratio to another is performed in response to engine throttle and vehicle speed, and generally involves releasing or disengaging the clutch or brake (off-going) associated with the current speed ratio and applying or engaging the clutch or brake (on-coming) associated with the desired speed ratio.

Shifts performed in the above manner, using clutches and/or reaction clutches, are termed clutch-to-clutch shifts. Shifts of this type present particular control difficulty in situations where a downshift to a lower speed ratio is required to accelerate the vehicle or maintain speed up a grade. Such downshifts typically involve relatively high transmission input torque, and are referred to herein as power-on downshifts.

SUMMARY OF THE INVENTION

This invention is directed to a motor vehicle electronic transmission control system for achieving high quality clutch-to-clutch power-on downshifts without the use of freewheeling or one-way torque transmitting elements. The electronic control is used to advantage through its ability to continuously monitor various engine and transmission operating parameters and precisely control the pressure supplied to the clutching devices involved in the shift.

More particularly, a power-on downshift is initiated by reducing the torque capacity of the off-going clutching device so as to permit the transmission input speed to increase toward a target speed which it will finally attain subsequent to the shift. As the input speed is increasing, the value of the target speed is continuously determined as a function of the current vehicle speed and the downshifted speed ratio. When the input speed approaches its target speed, hydraulic fluid is directed to the on-coming clutching device to prepare it for engagement, and the torque capacity of the off-going clutching device is increased to a value sufficient to maintain the the input speed substantially at its target value. When the on-coming clutching device is prepared for engagement, it is applied as the off-going clutching device is released, completing the shift. Since the input speed is substantially at its target value when the exchange of clutching devices occurs, a high quality shift with minimal driveline torque disruption results.

The above shifting technique relies on the ability of the control system to accurately control the torque capacities of the various clutching devices during the shift. To this end, various calibrated pressure and timing parameters used in the shift are adaptively updated based on the performance of the system in each such shift. As a result, inaccuracies in such parameters due to miscalibration, transmission wear, etc., are compensated for over a number of shifts to achieve consistent high quality shifting.

IN THE DRAWINGS

FIGS. 1a and 1b schematically depict a computer based electronic transmission control system according to the teachings of this invention.

FIGS. 2a–2d graphically depict various parameters of the engine and transmission in the course of a power-on downshift according to this invention.

FIGS. 3–6 graphically depict terms used in the generation of the pressure command P(OFG) for the off-going clutching device according to this invention.

FIG. 7 depicts a main loop program; and

FIGS. 8–11d depict pressure control functions for a power-on downshift.

Figure 1B:
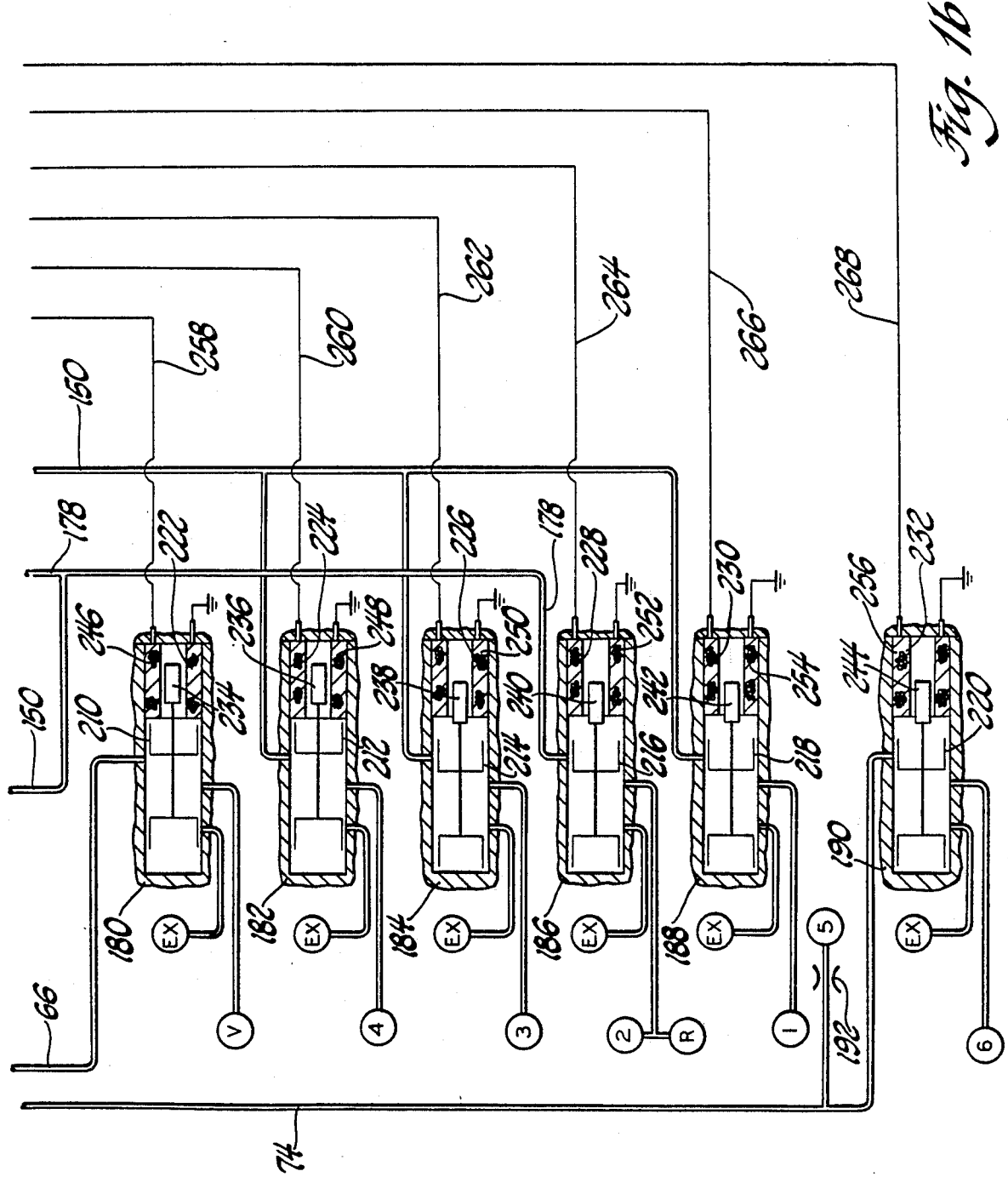

Referring now to the drawings, and more particularly to FIGS. 1a and 1b, the reference numeral 10 generally designates a motor vehicle drive train including an engine 12 and a parallel shaft transmission 14 having a reverse speed ratio and four forward speed ratios. Engine 12 includes a throttle mechanism 16 mechanically connected to an operator manipulated device such as an accelerator pedal (not shown) for regulating engine output torque, such torque being applied to the transmission 14 through the engine output shaft 18.

The transmission 14 transmits engine output torque to a pair of drive axles 20 and 22 through a torque converter 24 and one or more of the fluid operated clutching devices 26–34, such clutching devices being applied or released according to a predetermined schedule for establishing the desired transmission speed ratio.

Referring now more particularly to the transmission 14, the impeller or input member 36 of the torque converter 24 is connected to be rotatably driven by the output shaft 18 of engine 12 through the input shell 38. The turbine or output member 40 of the torque converter 24 is rotatably driven by the impeller 36 by means of fluid transfer therebetween and is connected to rotatably drive the shaft 42. A stator member 44 redirects the fluid which couples the impeller 36 to the turbine 40, the stator being connected through a one-way device 46 to the housing of transmission 14.

The torque converter 24 also includes a clutching device 26 comprising a clutch plate 50 secured to the shaft 42. The clutch plate 50 has a friction surface 52 formed thereon adaptable to be engaged with the inner surface of the input shell 38 to form a direct mechanical drive between the engine output shaft 18 and the transmission shaft 42. The clutch plate 50 divides the space between input shell 38 and the turbine 40 into two fluid chambers: an apply chamber 54 and a release chamber 56. When the fluid pressure in the apply chamber 54 exceeds that in the release chamber 56, the friction surface 52 of clutch plate 50 is moved into engagement with the input shell 38 as shown in FIG. 1, thereby engaging the clutching device 26 to provide a mechanical drive connection in parallel with the torque converter 24. In such case, there is no slippage between the impeller 36 and the turbine 40.

When the fluid pressure in the release chamber 56 exceeds that in the apply chamber 54, the friction surface 52 of the clutch plate 50 is moved out of engagement with the input shell 38 thereby uncoupling such mechanical drive connection and permitting slippage between the impeller 36 and the turbine 40. The circled numeral 5 represents a fluid connection to the apply chamber 54 and the circled numeral 6 represents a fluid connection to the release chamber 56.

A positive displacement hydraulic pump 60 is mechanically driven by the engine output shaft 18 through the input shell 38 and impeller 36 as indicated by the broken line 62. Pump 60 receives hydraulic fluid at low pressure from the fluid reservoir 64 and supplies pressurized fluid to the transmission control elements via output line 66. A pressure regulator valve (PRV) 68 is connected to the pump output line 66 and serves to regulate the fluid pressure (hereinafter referred to as line pressure) in line 66 by returning a controlled portion of the fluid therein to reservoir 64 via the line 70. In addition, pressure regulator valve 68 supplies fluid pressure for the torque converter 24 via line 74.

While the pump and pressure regulator valve designs are not critical to the present invention, a representative pump is disclosed in the Schuster U.S. Pat. No. 4,342,545 issued Aug. 3, 1982, and a representative pressure regulator valve is disclosed in the Vukovich U.S. Pat. No. 4,283,970 issued Aug. 18, 1981, such patents being assigned to the assignee of the present invention.

The transmission shaft 42 and a further transmission shaft 90 each have a plurality of gear elements rotatably supported thereon. The gear elements 80–88 are supported on shaft 42 and the gear elements 92–102 are supported on shaft 90. The gear element 88 is rigidly connected to the shaft 42, and the gear elements 98 and 102 are rigidly connected to the shaft 90. Gear element 92 is connected to the shaft 90 via a free wheeler or one-way device 93. The gear elements 80, 84, 86 and 88 are maintained in meshing engagement with the gear elements 92, 96, 98 and 100, respectively, and the gear element 82 is coupled to the gear element 94 through a reverse idler gear 103. The shaft 90, in turn, is coupled to the drive axles 20 and 22 through gear elements 102 and 104 and a conventional differential gear set (DG) 106.

A dog clutch 108 is splined on the shaft 90 so as to be axially slidable thereon, and serves to rigidly connect the shaft 90 either to the gear element 96 (as shown) or the gear element 94. A forward speed relation between the gear element 84 and shaft 90 is established when dog clutch 108 connects the shaft 90 to gear element 96, and a reverse speed relation between the gear element 82 and shaft 90 is established when the dog clutch 108 connects the shaft 90 to the gear element 94.

The clutching devices 28–34 each comprise an input member rigidly connected to a transmission shaft 42 or 90, and an output member rigidly connected to one or more gear elements such that engagement of a clutching device couples the respective gear element and shaft to effect a driving connection between the shafts 42 and 90. The clutching device 28 couples the shaft 42 to the gear element 80; the clutching device 30 couples the shaft 42 to the gear elements 82 and 84; the clutching device 32 couples the shaft 90 to the gear element 100; and the clutching device 34 couples the shaft 42 to the gear element 86. Each of the clutching devices 28–34 is biased toward a disengaged state by a return spring (not shown).

Engagement of the clutching device is effected by supplying fluid pressure to an apply chamber thereof. The resulting torque capacity of the clutching device is a function of the applied pressure less the return spring pressure, hereinafter referred to as the working pressure delta P. The circled numeral 1 represents a fluid passage for supplying pressurized fluid to the apply chamber of clutching device 28; the circled numeral 2 and letter R represent a fluid passage for supplying pressurized fluid to the apply chamber of the clutching device 30; the circled numeral 3 represents a fluid passage for supplying pressurized fluid to the apply chamber of the clutching device 32; and the circled numeral 4 represents a fluid passage for directing pressurized fluid to the apply chamber of the clutching device 34.

The various gear elements 80–88 and 92–100 are relatively sized such that engagement of first, second, third and fourth forward speed ratios are effected by engaging the clutching devices 28, 30, 32 and 34, respectively, it being understood that the dog clutch 108 must be in the position depicted in FIG. 1 to obtain a forward speed ratio. A neutral speed ratio or an effective disconnection of the drive axles 20 and 22 from the engine output shaft 18 is effected by maintaining all of the clutching devices 28–34 in a released condition. The speed ratios defined by the various gear element pairs are generally characterized by the ratio of the turbine speed $N_t$ to output speed $N_o$. Representative $N_t/N_o$ ratios for transmission 14 are as follows:

| First - 2.368 | Second - 1.273 |
|---|---|
| Third - 0.808 | Fourth - 0.585 |
| | Reverse - 1.880 |

As indicated above, shifting from a current forward speed ratio to a desired forward speed ratio requires that the clutching device associated with the current speed ratio (off-going) be disengaged and the clutching device associated with the desired speed ratio (on-coming) be engaged. For example, a shift from the first forward speed ratio to the second forward speed ratio involves disengagement of the clutching device 28 and engagement of the clutching device 30. As explained below, the timing of such disengagement and engagement is critical to the attainment of high quality shifting, and this invention is directed primarily to a control system for supplying fluid pressure to the various clutching devices 28–34 to achieve consistent high quality power-on downshifts.

The fluid control elements of the transmission 14 include a manual valve 140, a directional servo 160 and a plurality of electrically operated fluid valves 180–190. The manual valve 140 operates in response to operator demand and serves, in conjunction with directional servo 160, to direct regulated line pressure to the appropriate fluid valves 182–188. The fluid valves 182–188, in turn, are individually controlled to direct fluid pressure to the clutching devices 28–34. The fluid valve 180 is controlled to direct fluid pressure from the pump output line 66 to the pressure regulator valve 68, and the fluid valve 190 is controlled to direct fluid pressure from the line 74 to the clutching device 26 of torque converter 24. The directional servo 160 operates in response to the condition of the manual valve 140 and serves to properly position the dog clutch 108.

The manual valve 140 includes a shaft 142 for receiving axial mechanical input from the operator of the motor vehicle in relation to the speed range the operator desires. The shaft 142 is also connected to an indicator mechanism 144 through a suitable mechanical linkage as indicated generally by the broken line 146. Fluid pressure from the pump output line 66 is applied as an input to the manual valve 140 via the line 148 and the valve outputs include a forward (F) output line 150 for supplying fluid pressure for engaging forward speed ratios and a reverse (R) output line 152 for supplying fluid pressure for engaging the reverse speed ratio. Thus, when the shaft 142 of manual valve 140 is moved to the D4, D3, or D2 positions shown on the indicator mechanism 144, line pressure from the line 148 is directed to the forward (F) output line 150. When the shaft 142 is in the R position shown on the indicator mechanism 144, line pressure from the line 148 is directed to the reverse (R) output line 152. When the shaft 142 of manual valve 140 is in the N (neutral) or P (park) positions, the input line 148 is isolated, and the forward and reverse output lines 150 and 152 are connected to an exhaust line 154 which is adapted to return any fluid therein to the fluid reservoir 64.

The directional servo 160 is a fluid operated device and includes an output shaft 162 connected to a shift fork 164 for axially shifting the dog clutch 108 on shaft 90 to selectively enable either forward or reverse speed ratios. The output shaft 162 is connected to a piston 166 axially movable within the servo housing 168. The axial position of the piston 166 within the housing 168 is determined according to the fluid pressures supplied to the chambers 170 and 172. The forward output line 150 of manual valve 140 is connected via line 174 to the chamber 170 and the reverse output line 152 of manual valve 140 is connected via the line 176 to the chamber 172. When the shaft 142 of the manual valve 140 is in a forward range position, the fluid pressure in the chamber 170 urges piston 166 rightward as viewed in FIG. 1 to engage the dog clutch 108 with the gear element 96 for enabling engagement of a forward speed ratio. When the shaft 142 of the manual valve 140 is moved to the R position, the fluid pressure in chamber 172 urges piston 166 leftward as viewed in FIG. 1 to engage the dog clutch 108 with the gear element 94 for enabling engagement of the reverse speed ratio. In each case, it will be remembered that the actual engagement of the second or reverse speed ratio is not effected until engagement of the clutching device 30.

The directional servo 160 also operates as a fluid valve for enabling the reverse speed ratio. To this end, the directional servo 160 includes an output line 178 connected to the electrically operated fluid valve 186. When the operator selects a forward speed ratio and the piston 166 of directional servo 160 is in the position depicted in FIG. 1, the passage between lines 176 and 178 is cut off; when the operator selects the reverse gear ratio, the passage between the lines 176 and 178 is open.

The electrically operated fluid valves 180–190 each receive fluid pressure at an input passage thereof from the pump 60, and are individually controlled to direct fluid pressure to the pressure regulator valve 68 or respective clutching devices 26–34. The fluid valve 180 receives line pressure directly from pump output line 66, and is controlled to direct a variable amount of such pressure to the pressure regulator valve 68 as indicated by the circled letter V. The fluid valves 182, 186 and 188 receive fluid pressure from the forward output line 150 of manual valve 140, and are controlled to direct variable amounts of such pressure to the clutching devices 34, 32 and 28 as indicated by the circled numerals 4, 3 and 1, respectively. The fluid valve 186 receives fluid pressure from the forward output line 150 and the directional servo output line 178, and is controlled to direct a variable amount of such pressure to the clutching device 30 as indicated by the circled numeral 2 and the circled letter R. The fluid valve 190 receives fluid pressure from line 74 of pressure regulator valve 68, and is controlled to direct a variable amount of such pressure to the release chamber 56 of the clutching device 26 as indicated by the circled numeral 6. The apply chamber 54 of the clutching device 26 is supplied with fluid pressure from the output line 74 via the orifice 192 as indicated by the circled numeral 5.

Each of the fluid valves 180–190 includes a spool element 210–220, axially movable within the respective valve body for directing fluid flow between input and output passages. When a respective spool element 210–220 is in the rightmost position as viewed in FIG. 1, the input and output passages are connected. Each of the fluid valves 180–190 includes an exhaust passage as indicated by the circled letters EX, such passage serving to drain fluid from the respective clutching device when the spool element is shifted to the leftmost position as viewed in FIG. 1b. In FIG. 1b, the spool elements 210 and 212 of fluid valves 180 and 182 are shown in the rightmost position connecting the respective input and output lines, while the spool elements 214, 216, 218 and 220 of the fluid valves 184, 186, 188 and 190 are shown in the leftmost position connecting the respective output and exhaust lines. Each of the fluid valves 180–190 includes a solenoid 222–232 for controlling the position of its spool element 210–220. Each such solenoid 222–232 comprises a plunger 234–244 connected to the respective spool element 210–220 and a solenoid coil 246–256 surrounding the respective plunger. One terminal of each such solenoid coil 246–256 is connected to ground potential as shown, and the other terminal is connected to an output line 258–268 of a control unit 270 which governs the solenoid coil energization. As set forth hereinafter, the control unit 270 pulse-width-modulates the solenoid coils 246–256 according to a predetermined control algorithm to regulate the fluid pressure supplied to the pressure regulator 68 and the clutching devices 26–34, the duty cycle of such modulation being determined in relation to the desired magnitude of the supplied pressures.

While the fluid valves 180–190 have been illustrated as spool valves, other types of valves could be substituted therefor. By way of example, valves of the ball and seat type could be used. In general terms, the fluid valves 180–190 may be mechanized with any three port pulse-width-modulated valving arrangement.

Input signals for the control unit 270 are provided on the input lines 272–284. A position sensor (S) 286 responsive to movement of the manual valve shaft 142 provides an input signal to the control unit 270 via line 272. Speed transducers 288, 290 and 292 sense the rotational velocity of various rotary members within the transmission 14 and supply speed signals in accordance therewith to the control unit 270 via lines 274, 276, and 278, respectively. The speed transducer 288 senses the velocity of the transmission shaft 42 and therefore the turbine or transmission input speed $N_t$; the speed transducer 290 senses the velocity of the drive axle 22 and therefore the transmission output speed $N_o$; and the speed transducer 292 senses the velocity of the engine output shaft 18 and therefore the engine speed $N_e$. The position transducer 294 is responsive to the position of the engine throttle 16 and provides an electrical signal in accordance therewith to control unit 270 via line 280.

A pressure transducer 296 senses the manifold absolute pressure (MAP) of the engine 12 and provides an electrical signal to the control unit 270 in accordance therewith via line 282. A temperature sensor 298 senses the temperature of the oil in the transmission fluid reservoir 64 and provides an electrical signal in accordance therewith to control unit 270 via line 284.

The control unit 270 responds to the input signals on input lines 272-284 according to a predetermined control algorithm as set forth herein, for controlling the energization of the fluid valve solenoid coils 246-256 via output lines 258-268. As such, the control unit 270 includes an input/output (I/O) device 300 for receiving the input signals and outputting the various pulse-width-modulation signals, and a microcomputer 302 which communicates with the I/O device 300 via an address-and-control bus 304 and a bidirectional data bus 306. Flow diagrams representing suitable program instructions for developing the pulse-width-modulation outputs in accordance with the teachings of this invention are depicted in FIGS. 7-11.

Figure 2:
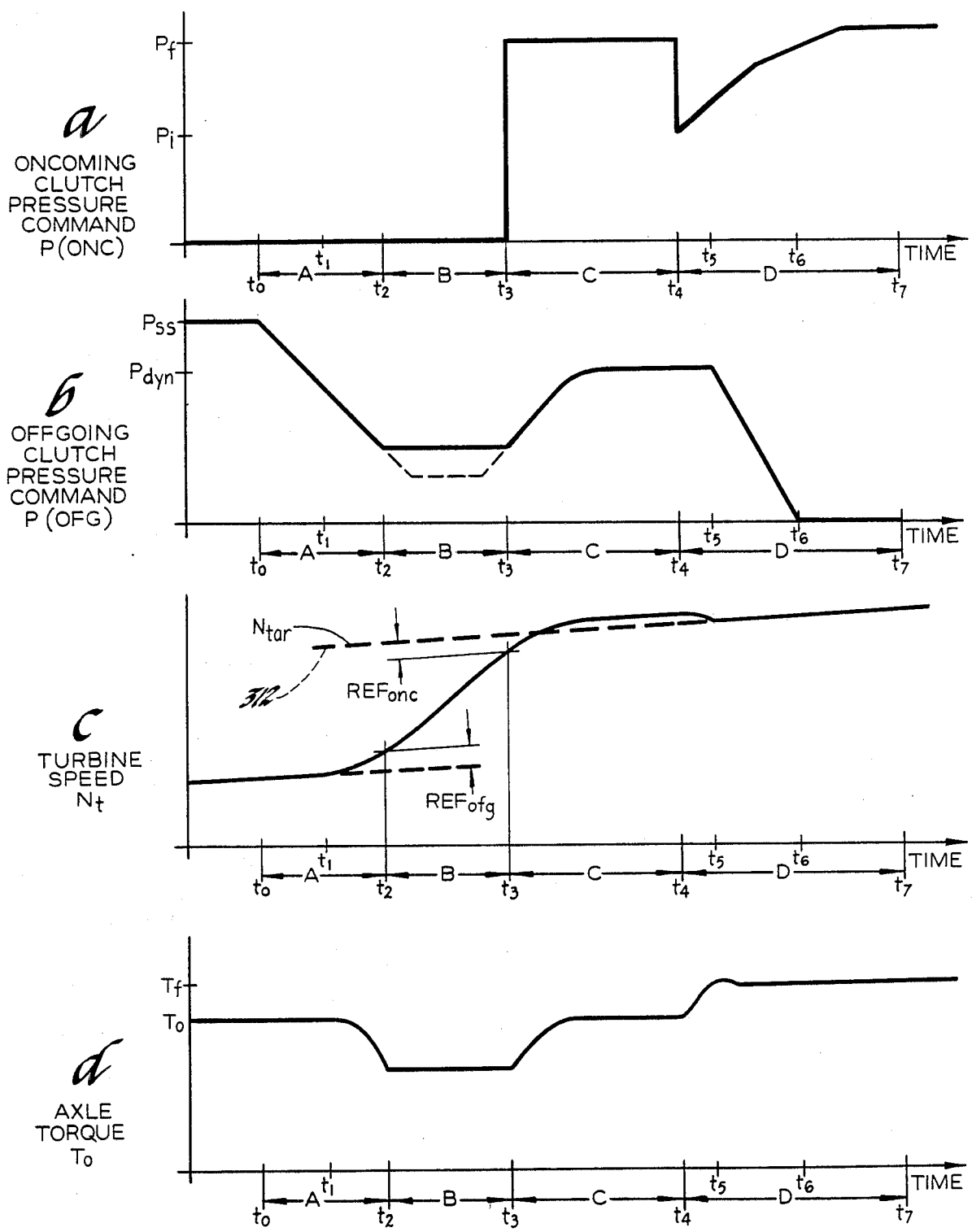

Transmission operating parameters pertinent to the power-on downshift of this invention are graphically depicted on a common time base in Graphs a-d of FIG. 2. Graph 2a depicts the pressure command P(ONC) for the on-coming clutching device; Graph 2b depicts the pressure command P(OFG) for the off-going clutching device; Graph 2c depicts the turbine speed $N_t$; and Graph 2d depicts the axle or output torque $T_o$. As set forth in the graphs, a power-on downshift according to this invention is functionally divided into four phases A, B, C, and D. Additionally, the designations $t_0$-$t_7$ appear on the time axes to facilitate the description of the sequence of events in the shift.

Prior to time $t_0$, a relatively high speed ratio, third for example, is engaged to generate an axle torque $T_0$. Accordingly, the pressure command P(OFG) for the active (off-going) clutching device 32 is maintained at a relatively high steady state value $P_{ss}$ as seen in Graph 2b. Such pressure command is obtained from a predetermined and torque dependent schedule designed to prevent any slippage. Although the clutching device 26 for the torque converter 24 could be applied, it is assumed for the purpose of this example that it is released.

At time $t_0$, the control unit 270 commands a 3-2 downshift, marking the beginning of the A phase as designated in FIG. 2. The shift may be commanded in response to either a decrease in vehicle speed or an increase in the setting of the engine throttle 16, and is thus considered to be a power-on downshift. In the A phase of the shift, the pressure command P(OFG) for the off-going clutching device 32 is progressively reduced according to a predetermined, torque and time dependent schedule as seen in Graph 2b. Such schedule is referred to herein as the off-going release schedule and is graphically depicted in FIG. 3, where the pressure command is designated P(OFG) and the torque variable is designated $T_v$.

Figure 3:
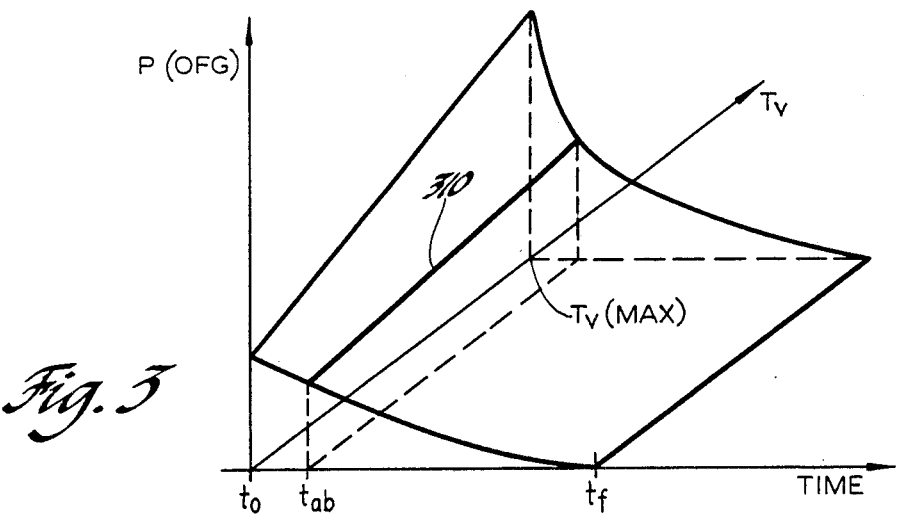

The pressure schedule shown in FIG. 3 is matched to the steady state pressure schedule referred to in reference to Graph 2b so that the initial pressure command P(OFG) obtained from the phase A schedule of FIG. 3 (at time $t_0$) corresponds with the steady state pressure command $P_{ss}$ in effect prior to the shift. The clutching device 32 begins to slip at time $t_1$, and the turbine speed $N_t$ begins to increase with engine speed $N_e$ as seen in Graph 2c. Due to the slipping, the axle torque $T_o$ begins to decrease, as seen in Graph 2d. When the slip, delta $N_{ofg}$, between the friction elements of the off-going clutching device 32 exceeds a turbine speed dependent reference, $REF_{ofg}$, the A phase of the shift is ended, and the B phase begun. The slip delta $N_{ofg}$ may be thought of as the difference between the turbine speed $N_t$ and the output speed $n_o$ as reflected through the differential gearset 106 to the transmission shaft 90. Accordingly, the slip reference $REF_{ofg}$ is graphically depicted with respect to an extension of the turbine speed trace in Graph 2c.

In phase B of the shift, the reduction of the pressure command P(OFG) for the clutching device 32 is ceased, allowing the turbine speed $N_t$ to continue increasing as seen in Graphs 2b and 2c. During this time, the axle torque $T_o$ remains relatively constant with the pressure command P(OFG) as seen in Graph 2d. Referring to the off-going release schedule of FIG. 3, the phase B pressure command P(OFG) is obtained by freezing the time variable at the A-B transition. Thus, the pressure command P(OFG) retains its torque dependency after time $t_2$, and can vary along the trace 310 in FIG. 3.

At time $t_3$, the turbine speed $N_t$ rises to within a reference amount $REF_{onc}$ of its target value $N_{tar}$ for the downshifted or second speed ratio, ending the B phase of the shift. Such target value is represented by the broken trace 312 in Graph 2c, and is easily computed as a function of the output speed $N_o$ and the speed ratios provided by the differential gear set 106 and the gear elements 84 and 96 of the second ratio. The reference amount $REF_{onc}$ is determined as a function of the turbine speed and physically refers to the slip between the friction elements of the on-coming clutching device 30, and is graphically depicted in Graph 2c with respect to the target speed trace 312.

As indicated above, the references $REF_{onc}$ and $REF_{ofg}$ are turbine speed dependent. More particularly, the references $REF_{onc}$ and $REF_{ofg}$ increase with increasing turbine speed so as to permit a faster rate of increase in turbine speed during relatively high speed shifting. This tends to shorten the duration of the B phase of the shift with increasing turbine speed, thereby preventing the duration of high speed shifts from becoming excessive.

In phase C of the shift, the pressure command P(ONC) for the on-coming clutching device 30 is increased to a torque dependent level $P_f$ as seen in Graph 2a to fill the apply chamber thereof in preparation for clutch engagement. At the same time, the pressure command P(OFG) for the off-going clutching device 32 is increased to a dynamic value $P_{dyn}$ as seen in Graph 2b for holding the turbine speed $N_t$ slightly higher than the second ratio target speed depicted by the trace 312. As explained below, the dynamic pressure command $P_{dyn}$ is determined in accordance with an open loop term $P_{ol}$, a closed loop term $P_{cl}$, and an adaptive term $P_{ad}$. The open loop term $P_{ol}$ is determined according to a predetermined schedule as a function of torque and time as with the off-going release schedule of FIG. 3; the closed loop term $P_{cl}$ is determined as a function of the difference between the turbine speed $N_t$ and the target speed $N_{tar}$ for the downshifted speed ratio; and the adaptive term $P_{ad}$ is determined as a function of turbine speed $N_{bc}$ at the transition between the B phase and the C phase. The increasing pressure command causes an increase in the torque capacity of the off-going clutching device 32, and the axle torque $T_o$ returns approximately to its preshift value, $T_0$.

In practice, it has been found that the turbine speed $N_t$ should be held slightly above the target speed $N_{tar}$ for a minimum hold time $t_{hold}$ regardless of the time required to fill the on-coming clutching device. However, it is not desirable to hold the on-coming clutching device in a filled condition. Thus, the start of fill may be delayed until after time $t_3$ if the computed fill time $t_{fill}$ is less than the minimum hold time $t_{hold}$.

At time $t_4$, the on-coming clutching device 30 is filled, marking the end of phase C and the beginning of phase D. At such time, the pressure command P(ONC) for the on-coming clutching device 30 is reduced to a scheduled (torque dependent) initial value $P_i$ and then progressively increased as a function of the torque variable $T_v$, and time, as seen in Graph 2a. As the torque capacity of the on-coming clutching device 30 increases, the turbine speed $N_t$ decreases toward the target speed for the downshifted speed ratio, and the axle torque $T_o$ increases toward its post-shift level, $T_f$. At time $t_5$, a calibrated time after time $t_4$, the pressure command P(OFG) is progressively reduced to zero as seen in Graph 2b to progressively release the off-going clutching device 32. At time $t_6$, the off-going clutching device 32 is fully released, and at time $t_7$, the on-coming clutching device 30 is fully applied, ending phase D and completing the 3-2 downshift.

The control method just described permits the achievement of consistently high quality clutch-to-clutch power-on downshifts without the use of free-wheeling or one-way torque transmitting elements. The ability to electronically schedule the apply forces of the various torque establishing devices is used to bring the transmission input speed (turbine speed $N_t$) to a predetermined value in relation to its target speed in the downshifted speed ratio prior to the engagement of the on-coming clutching device, thereby minimizing the driveline torque disruption associated with the shift. The adaptive pressure command term $P_{ad}$ ensures that the shift quality will not be degraded due to miscalibration, wear, or other sources of error which affect the ability of the controls to accurately supply the commanded pressures.

Figure 4:
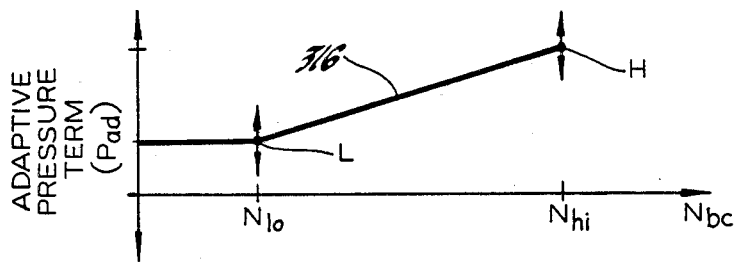

The schedule for the adaptive term $P_{ad}$ of the pressure command P(OFG) is graphically depicted in FIG. 4. As indicated above, the adaptive term $P_{ad}$ is scheduled as a function of the turbine speed $N_{bc}$ at the transition between the B and C phases of the shift. As set forth in FIG. 4, the adaptive term $P_{ad}$ is defined by the two points L and H which correspond to the reference low speed $N_{lo}$ and the reference high speed $N_{hi}$. The adaptive term $P_{ad}$ for any value of $N_{bc}$ falling between $N_{lo}$ and $N_{hi}$ is linearly interpolated along the line 316 connecting the points L and H. Each of the points L and H may be raised or lowered as indicated in FIG. 4 to adjust the value of the adaptive term $P_{ad}$ if desired.

Figure 5:
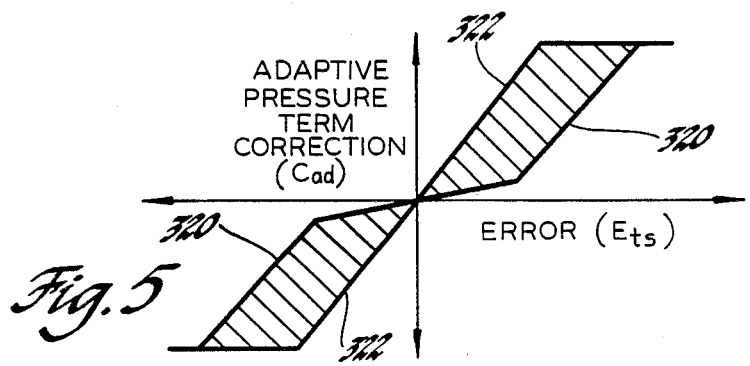
Figure 6:
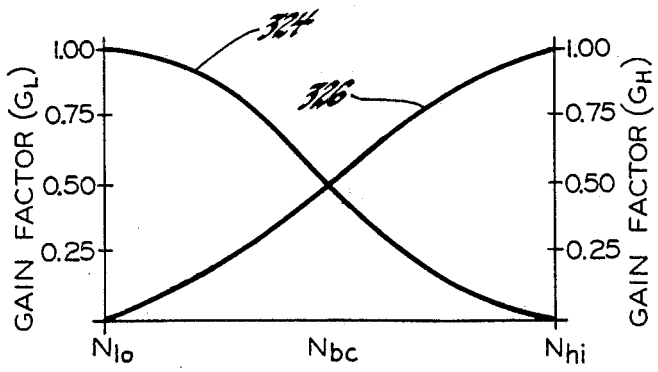

The adjustment of the adaptive term $P_{ad}$ used in the development of the pressure command P(OFG) in the course of a power-on downshift is graphically depicted in the FIGS. 5-6. At the transition from the C phase to the D phase, the difference delta $N_t$ between the turbine speed $N_t$ and the target speed $N_{tar}$ for the downshifted speed ratio is measured. As noted above in reference to Graph 2c, the pressure command P(OFG) is designed to maintain the turbine speed $N_t$ slightly higher than the target speed $N_{tar}$. At the end of each power-on downshift, the measured difference delta $N_t$ is compared to a reference difference $REF_{dif}$ to arrive at a turbine speed error term $E_{ts}$, which in turn, is used to adjust the adaptive pressure term $P_{ad}$. The graph of FIG. 5 depicts an adaptive pressure correction term $C_{ad}$ as a function of the turbine speed error $N_{ts}$, and the graph of FIG. 6 illustrates how the correction term $C_{ad}$ is applied to the points L and H defined in FIG. 4.

Referring particularly to FIG. 5, the pressure correction term $C_{ad}$ is determined as a function of turbine speed error $E_{ts}$ in accordance with a nonlinear base gain schedule and a nonlinear direction sensitive dynamic gain modifier. The base gain schedule is depicted by the trace 320 and is relatively low for achieving relatively low converged misadjustment of the adaptive pressure term $P_{ad}$; the dynamic gain modifier serves to increase the base gain in relation to the time integral of the measured error. The authority of the dynamic gain modifier is limited by a maximum overall gain depicted by the trace 322, which gain is dependent on the error magnitude. The modifier is reset to zero when a significant error of the opposite sign is detected. Turbine speed error that is positive in sign ($N_{diff}$ too large) produces a positive correction for increasing the adaptive pressure term $P_{ad}$. Turbine speed error that is negative in sign ($N_{diff}$ too small) produces a negative correction for decreasing the adaptive pressure term $P_{ad}$. The dynamic gain modifier can increase the base gain correction (in either positive or negative sense) up to the maximum overall gain in relation to the integral of error signal $E_{ts}$ in one direction. Graphically, the shaded areas between the traces 320 and 322 represent the authority range of the dynamic gain modifier. In this way, the adaptive pressure correction $C_{ad}$ is determined primarily in accordance with the base schedule gain when the distribution of sensed error is centered at or near zero error. When the distribution of sensed error becomes significantly skewed in either the positive or negative direction, the dynamic gain modifier becomes active and adds to the base gain to achieve fast correction of the error. Essentially, the adaptive corrections become greater with increased sensed error and increased time required to correct the error.

Referring particularly to FIG. 6, the adaptive pressure correction $C_{ad}$ is apportioned between the points L and H of FIG. 4 in accordance with the turbine speed $N_{tbc}$ at the transition between the B and C phases of the shift. The mechanization of such apportionment is graphically depicted by the traces 324 and 326. The trace 324 represents a gain factor $G_L$ for the end point L, and the trace 326 represents a gain factor $G_H$ for the end point H. After each power-on downshift where an adaptive pressure correction is in order, the end point L is adjusted by the amount ($C_{ad} * G_L$), and the end point H is adjusted by the amount ($C_{ad} * G_H$). Separate pressure terms $P_{ad}$ and corresponding points L and H are provided for each type of power-on downshift (i.e., 3-2, 4-2, etc.) so that in future power-on downshifts, the calculated pressure command P(OFG) will cause the speed difference $N_{diff}$ to more nearly correspond to the reference difference $REF_{dif}$. As a result, changing conditions which affect the ability of the control system elements to accurately schedule the off-going pressure command P(OFG) will be fully compensated for over a number of power-on downshifts of a given type.

Figure 7:
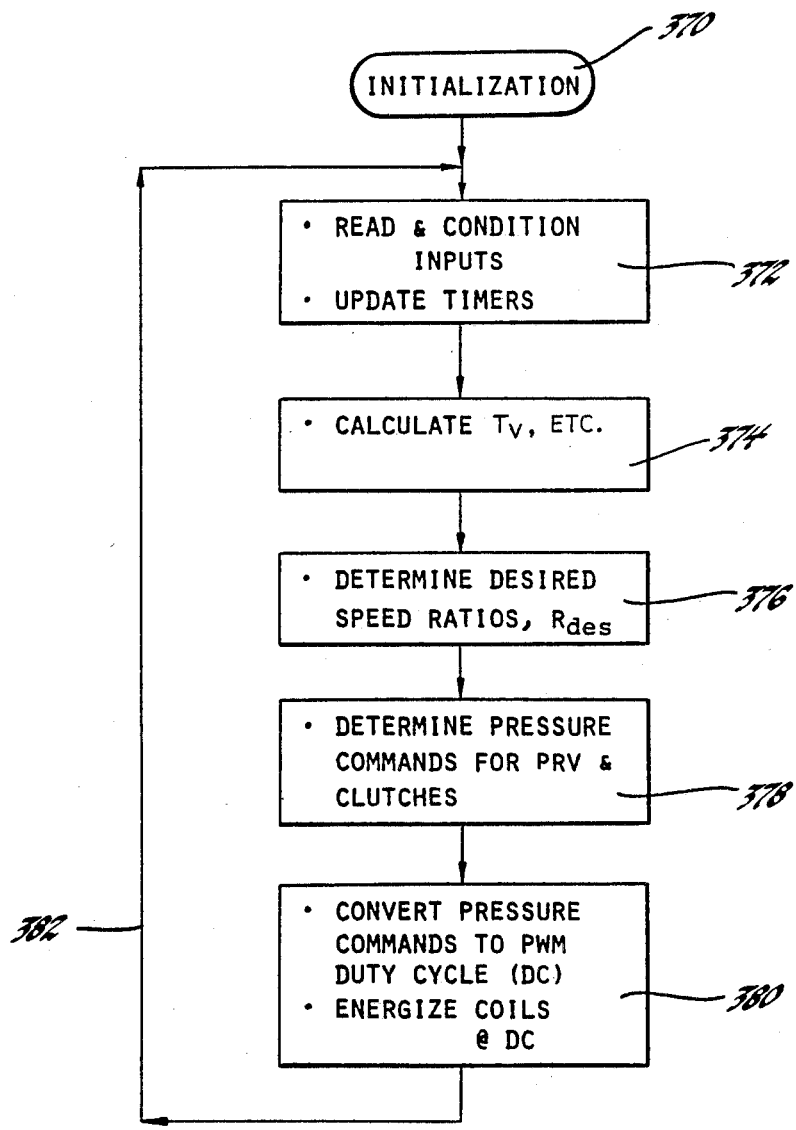
FIGS. 7–11d depict flow diagrams representative of suitable program instructions executed by the computer based controller of FIGS. 1a and 2b for carrying out the control functions of this invention.

The flow diagrams depicted in FIGS. 7-11 represent program instructions to be executed by the microcomputer 302 of control unit 270 in mechanizing power-on downshift control function of this invention. The flow diagram of FIG. 7 represents a main or executive program which calls various subroutines for executing particular control functions as necessary. The flow diagrams of FIGS. 8-11 represent the functions performed by those subroutines which are pertinent to the present invention.

Referring now more particularly to FIG. 7, the reference numeral 370 designates a set of program instructions executed at the initiation of each period of vehicle operation for initializing the various registers, timers, etc. used in carrying out the control functions of this invention. Following such initialization, the instruction blocks 372-380 are repeatedly executed in sequence as designated by the flow diagram lines connecting such instruction blocks and the return line 382. Instruction block 372 reads and conditions the various input signals applied to I/O device 300 via the lines 272-284, and updates (increments) the various control unit timers. Instruction block 374 calculates various terms used in the control algorithms, including the torque variable $T_y$. The algebraic expression used to calculate the term $T_y$ is given in a co-pending patent application U.S. Ser. No. 802,676 filed Nov. 29, 1985, which is directed to the development of upshift pressure commands, and which is incorporated herein by reference. Instruction block 376 determines the desired speed ratio, $R_{des}$, in accordance with a number of inputs including throttle position, vehicle speed, and manual valve position. In transmission control, this function is generally referred to as shift pattern generation. Instruction block 378 determines the clutching device pressure commands for effecting a ratio shift, if required. The pressure commands for the pressure regulator valve PRV and nonshifting clutching devices are also determined. An expanded description of the instruction block 378 is set forth below in reference to the flow diagrams of FIGS. 8-11. Instruction block 380 converts the clutching device and PRV pressure commands to a PWM duty cycle based on the operating characteristics of the various actuators (empirically determined), and energizes the actuator coils accordingly.

Figure 8:
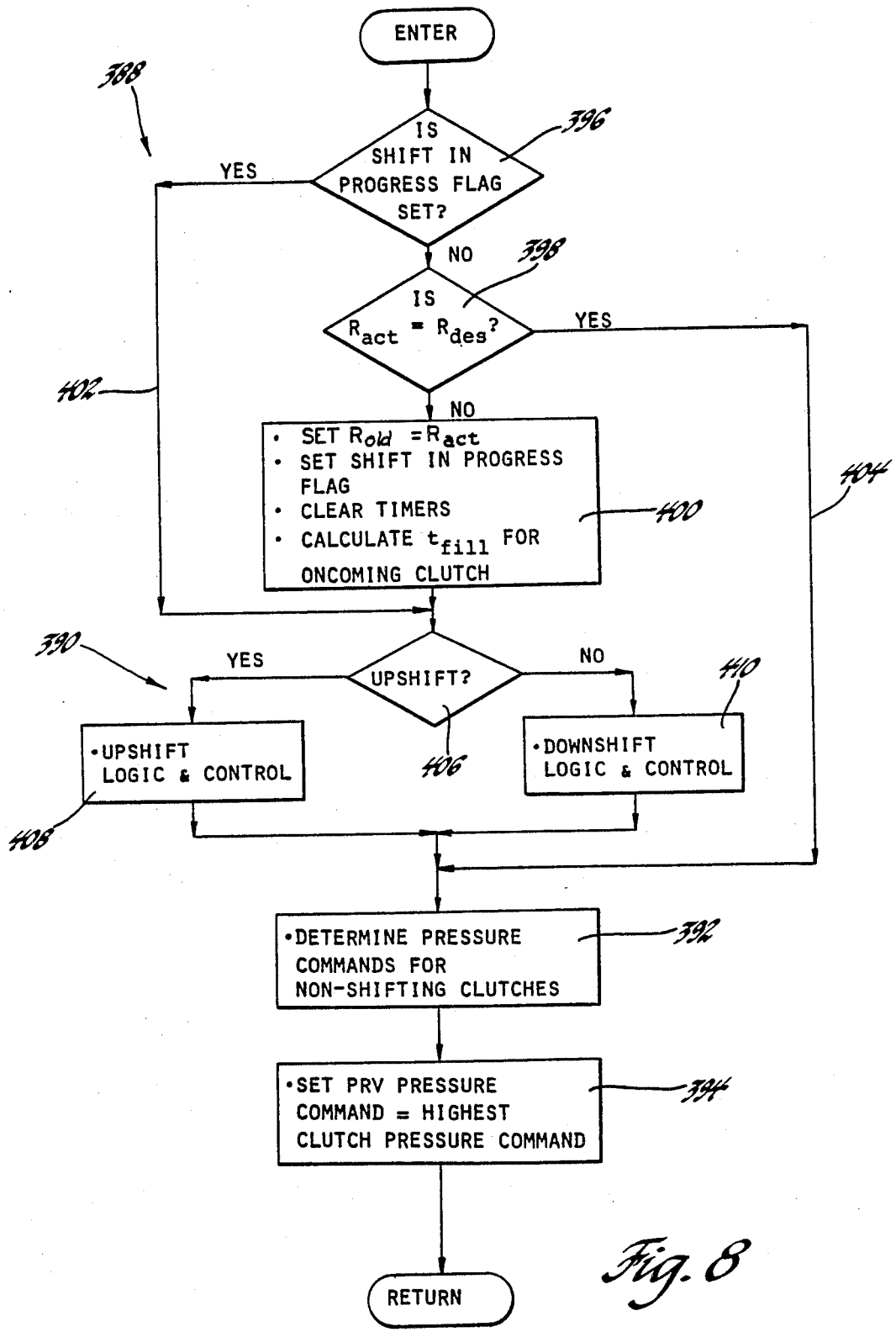

The flow diagrams of FIGS. 8-11 set forth the clutch and PRV pressure determination algorithm generally referred to at the main loop instruction block 378 of FIG. 7. Referring particularly to FIG. 8, the blocks designated generally by the reference numeral 388 are executed to set up initial conditions if a shift is in order. If a shift is in order, the blocks designated generally by the reference numeral 390 are executed to develop pressure commands for the clutching devices involved in the shift. Thereafter, the instruction blocks 392 and 394 are executed to develop pressure commands for the nonshifting clutches and the pressure regulator valve PRV, completing the routine. As indicated at instruction block 394, the pressure command for the regulator valve PRV is set equal to the highest of the pressure commands for the various clutching devices.

The blocks designated by the reference numeral 388 include the decision block 396 for determining if a shift is in progress as indicated by the "SHIFT IN PROGRESS" flag; the decision block 398 for determining if the actual speed ratio $R_{act}$ (that is, $N_o/N_i$) is equal to the desired speed ratio $R_{des}$ determined at instruction block 376 of FIG. 7; and the instruction block 400 for setting up the initial conditions for a ratio shift. The instruction block 400 is only executed when decision blocks 396 and 398 are both answered in the negative. In such case, instruction block 400 serves to set the old ratio variable, $R_{old}$, equal to $R_{act}$, to set the "SHIFT IN PROGRESS" flag, clear the shift timers, and to calculate the fill time $t_{fill}$ for the on-coming clutching device. If a shift is in progress, the execution of blocks 398 and 400 is skipped, as indicated by the flow diagram line 402. If no shift is in progress, and decision block 398 is answered in the affirmative, the execution of instruction block 400 and the blocks designated by the reference numeral 390 is skipped, as indicated by the flow diagram line 404.

The blocks designated by the reference numeral 390 include the decision block 406 for determining if the shift is an upshift or a downshift; the instruction block 408 for developing pressure commands for the active (shifting) clutching devices if the shift is an upshift; and the instruction block 410 for developing the pressure commands for the active clutching devices if the shift is a downshift. Since this invention is directed to the development of pressure commands for power-on downshifts, the instruction block 410 is set forth in greater detain in the flow diagrams of FIGS. 9-11.

Figure 9:
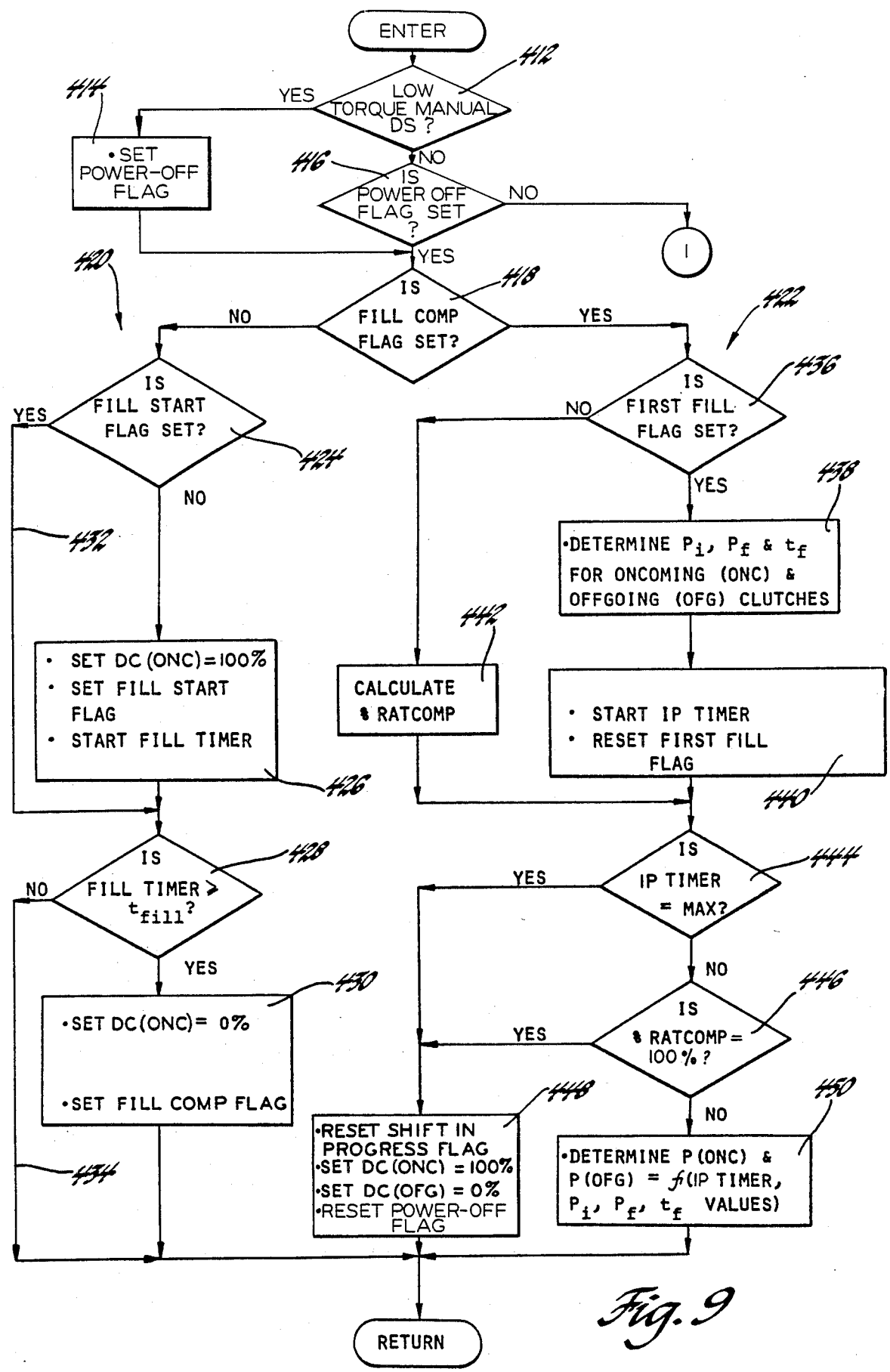

On entering the flow diagram of FIG. 9, the decision block 412 is first executed to determine if the commanded downshift is at low torque and in response to a repositioning of the manual valve 140. If so, the downshift can be performed in the traditional manner by merely releasing the active clutching device and applying the clutching device for the downshifted ratio. This type of shift is referred to as a power-off downshift, and the instruction block 414 is executed to set the "POWER-OFF" flag. The decision block 416 determines if the "POWER-OFF" flag has otherwise been set. If it is determined that a power-off downshift is in order, the remainder of the flow diagram of FIG. 9 is executed to fill the on-coming clutching device, and then to release the off-going clutching device and apply the on-coming clutching device. This procedure is carried out by first determining at decision block 418 if the fill phase of the shift is completed, as indicated by the "FILL COMP" flag. If not, the flow diagram branch generally designated by the reference numeral 420 is executed; if so, the flow diagram branch generally designated by the reference numeral 422 is executed.

The flow diagram branch 420 includes a fill initializing routine comprising the blocks 424 and 426, and a fill completion routine comprising the blocks 428 and 430. At the beginning of each power-off downshift, the "FILL COMP" flag is not set, and the decision block 424 of the fill initializing routine is executed to determine if the fill phase has started, as indicated by the "FILL START" flag. Initially, the "FILL START" flag is not set, and instruction block 426 is executed to set the energization duty cycle of the oncoming clutching device, DC(ONC), equal to 100%, to set the "FILL START" flag, and to start the FILL TIMER. Thereafter, decision block 424 is answered in the affirmative, and execution of instruction block 426 is skipped, as indicated by the flow diagram line 432. Decision block 428 of the fill completion routine determines if the count in FILL TIMER is greater than or equal to the fill time $t_{fill}$ determined at instruction block 400 of FIG. 8. If so, instruction block 430 is executed to set DC(ONC) equal to 0%, and to set the "FILL COMP" flag. If decision block 428 is answered in the negative, the fill phase is incomplete, and execution of the instruction block 430 is skipped, as indicated by the flow diagram line 434.

The flow diagram branch 422 includes a shift initializing routine comprising the blocks 436–442, and a shift completion routine comprising the blocks 444–450. Decision block 436 of the initializing routine determines if the "FILL COMP" flag has just been set, as indicated by the status of the "FIRST FILL" flag. If so, the instruction blocks 438 and 440 are executed to set up the torque and inertia phases of the shift. Instruction block 438 determines the pressure parameters $P_i$, $P_f$, and $t_f$ for the on-coming (ONC) and off-going (OFG) clutching devices in accordance with a predetermined and torque dependent pressure schedule of the general type depicted in FIG. 3 herein. Instruction block 440 starts the inertia phase timer IP TIMER, and resets the "FIRST FILL" flag. Thereafter, the decision block 436 is answered in the negative, and the instruction block 442 is executed to calculate the percent of ratio completion, %RATCOMP. In the inertia phase completion routine, the decision blocks 444 and 446 are executed to determine if the count in IP TIMER is at a maximum value, MAX, or if the term %RATCOMP is substantially equal to 100%. If either of the decision blocks 444 or 446 are answered in the affirmative, the shift is complete and instruction block 448 is executed to reset the "SHIFT IN PROGRESS" flag, to set the on-coming duty cycle DC(ONC) equal to 100%, to set the off-going duty cycle DC(OFG) equal to 0%, and to reset the "POWER-OFF" flag. If both decision blocks 444 and 446 are answered in the negative, the instruction block 450 is executed to determine the on-coming and off-going pressure commands, P(ONC) and P(OFG), as a function of the scheduled $P_i$, $P_f$, $t_f$, and IP TIMER values.

Figure 10:
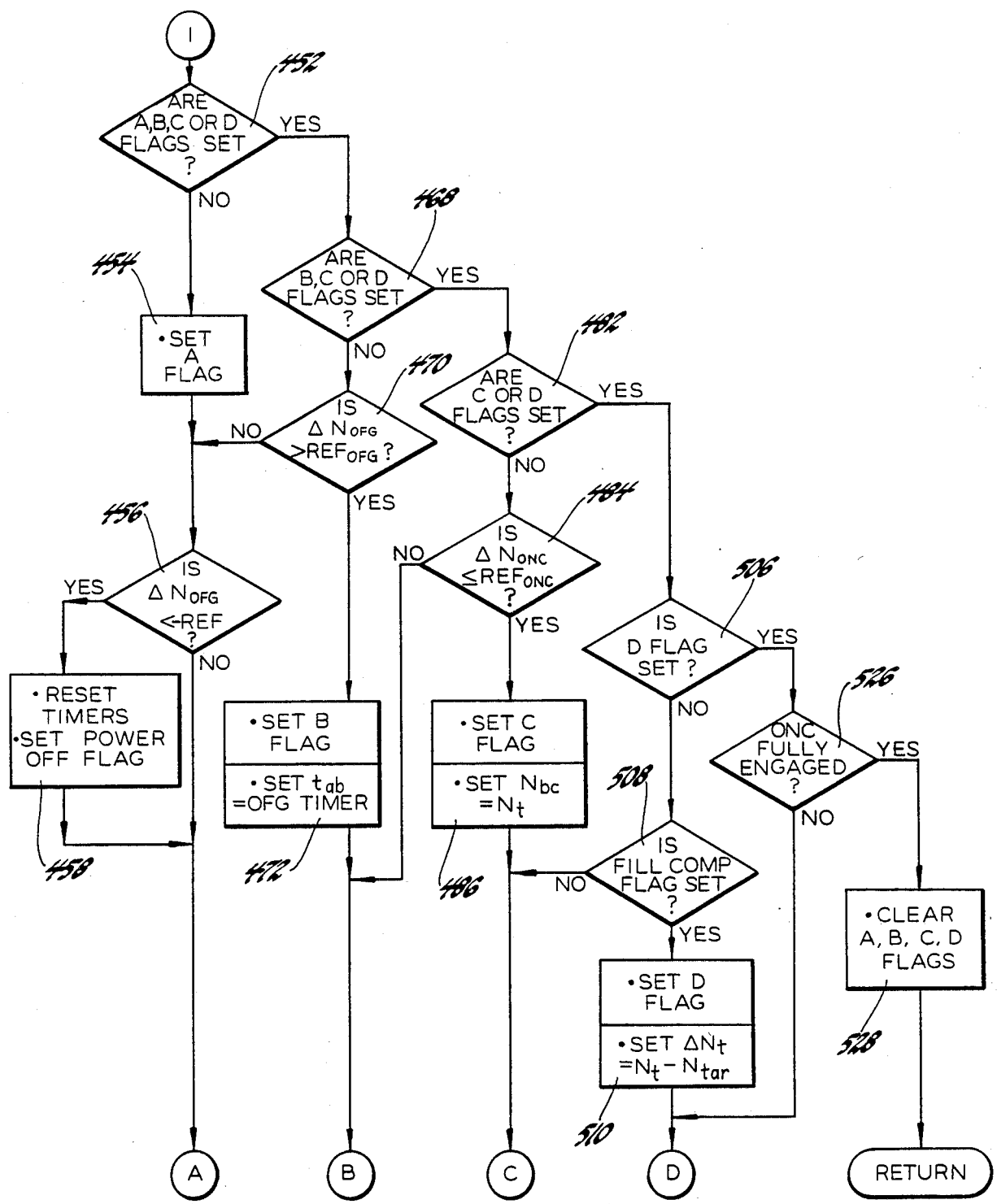
Figure 11A:
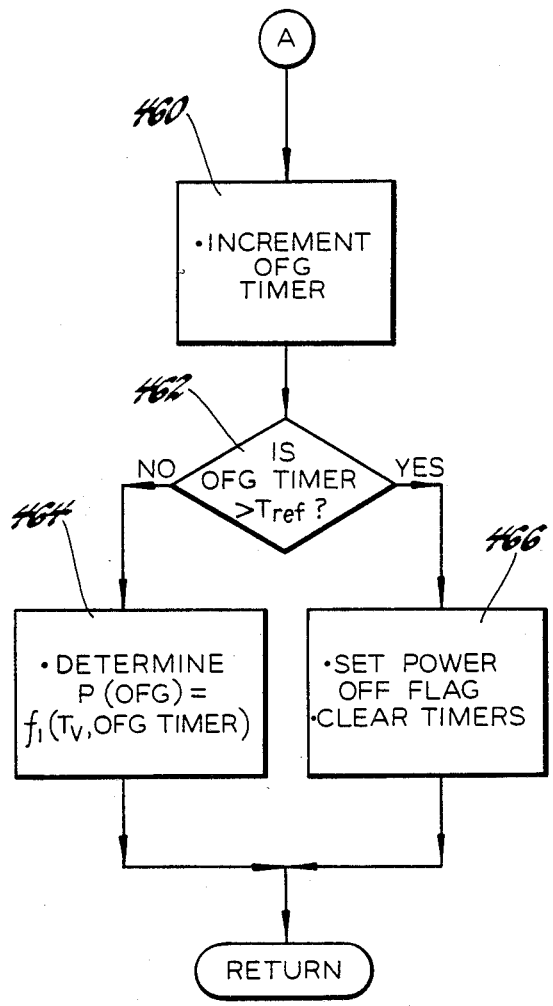
Figure 11B:
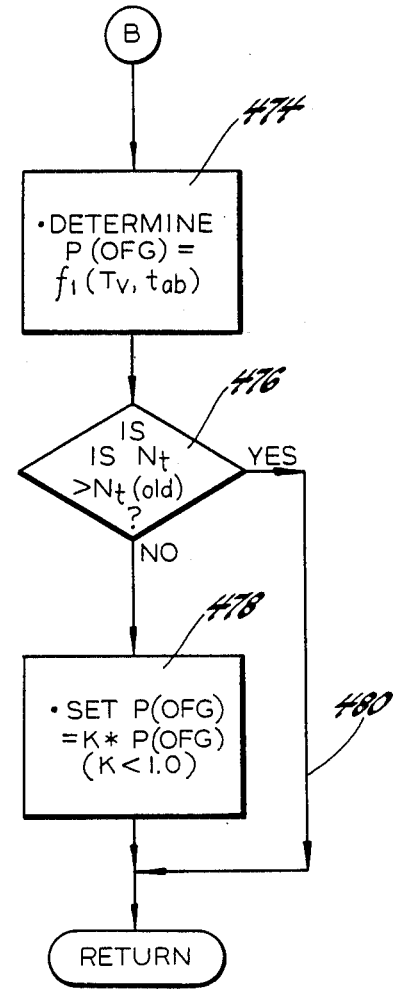
Figures 11C, 11D:
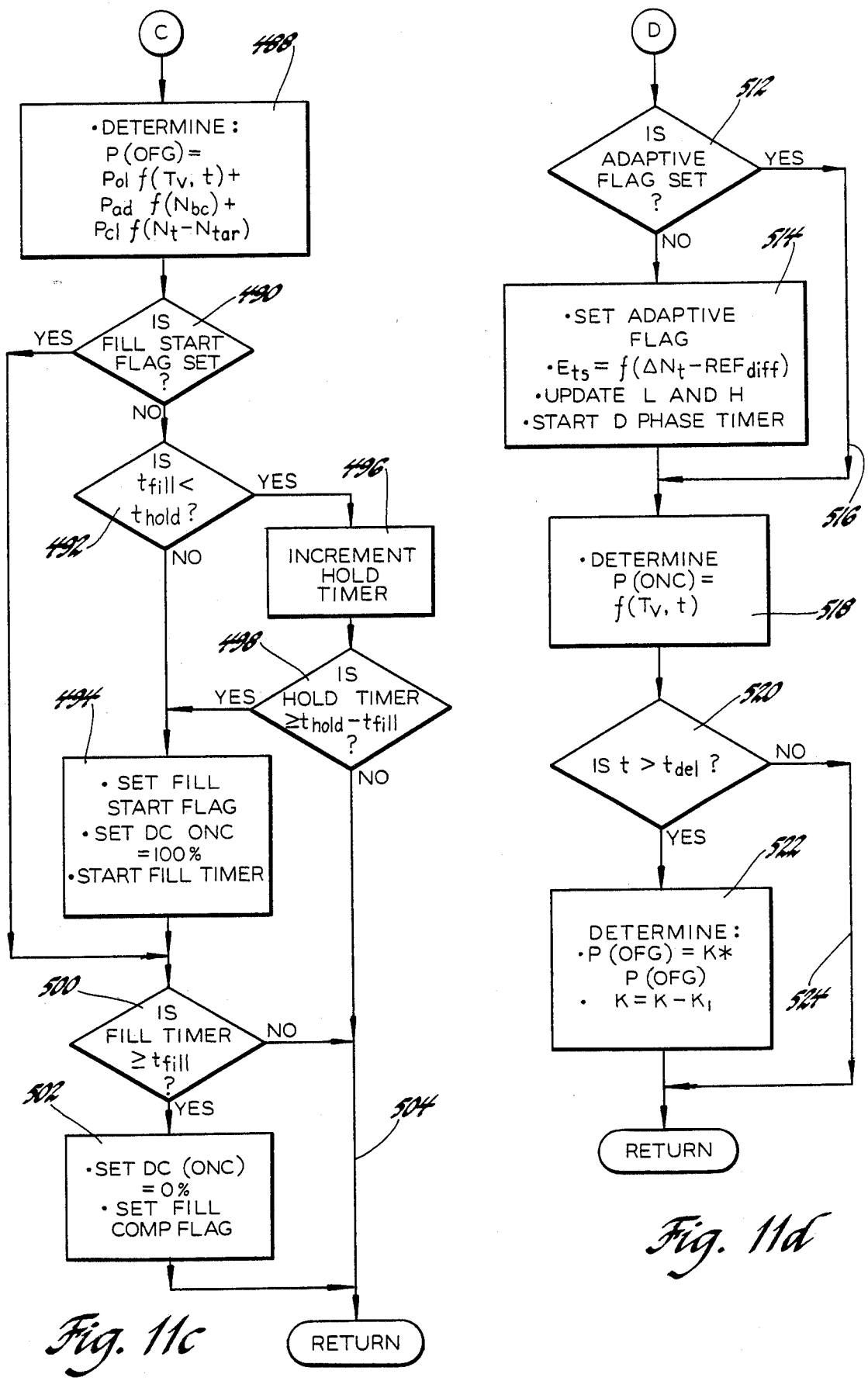

If the "POWER-OFF" flag is not set, the commanded shift is a power-on downshift, and the flow diagrams of FIGS. 10–11 are executed to effect the shift as indicated by the circled numeral one in FIGS. 9 and 10 and the circled letters A–D in FIGS. 10 and 11. The flow diagram of FIG. 10 serves to monitor the progress of the shift and to establish the different phases of the shift; it is referred to herein as the shift phase establishing routine. Four flags—"A", "B", "C", and "D"—are used to identify which phase of the shift is in effect, such flags corresponding to the letters A, B, C and D used in the graphs of FIG. 2. The flow diagrams of FIGS. 11a–11d develop the pressure commands P(ONC) and P(OFG) during the phases A–D, respectively.

The flow diagram of FIG. 10 is initiated by determining at decision block 452 if the "A", "B", "C", or "D" flags are set. If not, the shift has just been commanded, and instruction block 454 is executed to set the "A" flag. Then the decision block 456 is executed to determine if the slip speed of the off-going clutching device delta $N_{ofg}$ is negative in sign and greater in magnitude than a reference, $-REF$. If so, the power-on downshift control is not appropriate, and the instruction block 458 is executed to set the "POWER-OFF" flag and clear the various timers so that the shift can be restarted as a power-off downshift. As indicated by the circled letter A, the flow diagram of FIG. 11a is then executed to schedule the pressure command P(OFG) for progressively release the off-going clutching device as described above in reference to Graph 2b. Referring to that flow diagram, the instruction block 460 is executed to increment an off-going timer, OFG TIMER. Then the decision block 462 is set to determine if the count in OFG TIMER is greater than a relatively long time reference $T_{ref}$. If not, the shift is proceeding normally, and the instruction block 464 is executed to determine the pressure command P(OFG) for the off-going clutching device from the predetermined schedule of FIG. 3 as a function of the torque variable $T_v$ and the count (t) in the OFG TIMER. If the decision block 462 is answered in the affirmative, it is assumed that the shift should be performed with the power-off routine of FIG. 9, and the instruction block 466 is executed to set the "POWER-OFF" flag, and to clear the various timers so that the shift can be re-started as a power-off shift.

So long as the "A" flag is set, the decision block 468 of the shift phase establishing routine of FIG. 10 is executed to determine if the "B", "C", or "D" flags are set. If the decision block 468 is answered in the negative, the shift is in the A phase, and the decision block 470 is executed to compare the slip speed of the off-going clutching device delta $N_{ofg}$ to the reference slip $REF_{ofg}$. If the measured slip is less than or equal to the reference slip, phase A of the shift is still appropriate, and the flow diagram of FIG. 11a is re-executed. If the measured slip is greater than the reference slip, the instruction block 472 is executed to make the transition from phase A to phase B by setting the "B" flag and storing the count from the OFG TIMER in the term $t_{ab}$. As indicated by the circled letter B, the flow diagram of FIG. 11b is then executed to hold the pressure command P(OFG) while the turbine speed $N_t$ rises with the engine speed $N_e$ as described above in reference to Graphs 2b–2c.

Referring to that flow diagram, the instruction block 474 is executed to determine the pressure command P(OFG) from the predetermined schedule of FIG. 3 as a function of the torque variable $T_v$ and the stored time $t_{ab}$. Then the decision block 476 is executed to compare the current turbine speed $N_t$ with a prior turbine speed value $N_t$(old). If the current turbine speed value is not greater than the prior turbine speed value, the shift is not progressing as desired, and the instruction block 478 is executed to effect a further reduction of the pressure command P(OFG) by setting P(OFG)=k * P(OFG), where k is a calibrated constant of less than one (1.0). Further such reductions of the pressure command P(OFG) are effected until the current turbine speed $N_t$ exceeds the prior turbine speed $N_t$(old). At such time, the execution of instruction block 478 is skipped as indicated by the flow diagram line 480.

So long as the "B" flag is set, the decision block 482 of the shift phase establishing routine of FIG. 10 is executed to determine if the "C" or "D" flags are set. If the decision block 482 is answered in the negative, the shift is in the B phase, and the decision block 484 is executed to compare the slip speed of the on-coming clutching device delta $N_{onc}$ with the reference slip value $REF_{onc}$. If the measured slip is greater than the reference slip, the B phase is still appropriate, and the flow diagram of FIG. 11b is reexecuted as indicated by the circled letter B. If the measured slip is less than or equal to the reference slip, the instruction block 486 is executed to make the transition from the B phase to the C phase by setting the "C" flag and storing the turbine speed $N_t$ at the transition in the term $N_{bc}$. As indicated by the circled letter C, the flow diagram of FIG. 11c is then executed to start the fill of the oncoming clutching device, and to increase the pressure command P(OFG)

of the off-going clutching device for holding the turbine speed slightly above the target speed for the downshifted speed ratio as described above in reference to Graphs 2a–2c. Referring to that flow diagram, the instruction block 488 is executed to determine the pressure command P(OFG) in accordance with an open loop term $P_{ol}$, a closed loop term $P_{cl}$, and an adaptive term $P_{ad}$. The open loop term $P_{ol}$ is determined according to a predetermined schedule as a function of the torque variable $T_v$ and time as with the off-going release schedule of FIG. 3; the closed loop term $P_{cl}$ is determined as a function of the difference between the turbine speed $N_t$ and the target speed for the downshifted speed ratio; and the adaptive term $P_{ad}$ is determined as a function of turbine speed $N_{bc}$ stored by instruction block 486 at the transition between the B phase and the C phase.

The decision block 490 is then executed to determine if the "FILL START" flag is set. As described in reference to the power-off downshift routine of FIG. 9, the "FILL START" flag is initially reset, and decision block 490 is answered in the negative. In such case, the decision block 492 is then executed to determine if the fill time $t_{fill}$ computed at instruction block 400 of FIG. 8 is less than the predetermined hold time, $t_{hold}$. If not, instruction block 494 is executed to begin filling the on-coming clutching device by setting the "FILL START" flag, setting the duty cycle DC(ONC) of the solenoid valve associated with the on-coming clutching device to 100%, and starting the FILL TIMER. If the fill time $t_{fill}$ is less than the hold time $t_{hold}$, instruction block 496 is executed to increment a HOLD TIMER, and decision block 498 is executed to determine if the count in the HOLD TIMER is greater than or equal to the difference $(t_{hold} - t_{fill})$. If decision block 498 is answered in the affirmative, the instruction block 494 is executed to start the fill as described above. If the decision block 498 is answered in the negative, the fill is delayed.

In view of the above, it will be understood that the fill of the on-coming clutching device does not necessarily begin at the start of the C phase of the shift. Rather, the start of fill is determined in relation to the predetermined hold time $t_{hold}$ so that the duration of the C phase will be at least $t_{hold}$. As indicated above in reference to Graph 2c, this is done to ensure that the turbine speed is stabilized at a value slightly greater than the target speed $N_{tar}$ by the time of the transition between the C and D phases.

Once instruction block 494 has been executed to start the fill of the on-coming clutching device, the decision block 490 is answered in the affirmative, and the decision block 500 is executed to determine if the count in FILL TIMER is at least as great as the fill time $t_{fill}$. If so, the fill is complete, and the instruction block 502 is executed to set the duty cycle of the solenoid valve associated with the on-coming clutching device to 0% and to set the "FILL COMP" flag. If the fill is not complete, the execution of instruction block 502 is skipped as indicated by the flow diagram line 504.

So long as the "C" flag is set, the decision block 506 of the shift phase establishing routine of FIG. 10 is executed to determine if the "D" flag is set. If the decision block 506 is answered in the negative, the shift is in the C phase, and the decision block 508 is executed to determine if the "FILL COMP" flag is set. If not, the C phase is still appropriate, and the flow diagram of FIG. 11c is reexecuted as indicated by the circled letter C. If the "FILL COMP" flag is set, the instruction block 510 is executed to make the transition from the transition from the C phase to the D phase by setting the "D" flag and storing the difference between the turbine speed $N_t$ and target speed $N_{tar}$ at the transition in the term delta $N_t$. Such speed difference is used to adjust the adaptive term $P_{ad}$ of the pressure command P(OFG) as indicated above in reference to FIGS. 4–6. Then, as indicated by the circled letter D, the flow diagram of FIG. 11d is executed to apply the on-coming clutching device, and a predetermined time thereafter, to release the off-going clutching device, as described above in reference to Graphs 2a–2b.

In the flow diagram of FIG. 11d, the decision block 512 determines if an "ADAPTIVE" flag is set, such flag being used to identify the first execution of the D routine in a given shift. Initially, the "ADAPTIVE" flag is not set, and the instruction block 514 executed to set the "ADAPTIVE" flag, to compute the turbine speed error term $E_{ts}$ according to the difference (delta $N_t - REF_{diff}$), to update the adaptive points L and H as described in reference to FIGS. 4–6 above, and to start a D PHASE TIMER. In subsequent execution of the D routine during the shift, the "ADAPTIVE" flag is set, and the execution of instruction block 514 is skipped as indicated by the flow diagram line 516. Then the instruction block 518 is executed to determine the pressure command P(ONC) for the on-coming clutching device as a function of the torque variable $T_v$ and the count t in the D PHASE TIMER as described above in reference to Graph 2a. When the count in the D PHASE TIMER exceeds a reference delay $t_{del}$, as determined at decision block 520, the instruction block 522 is executed to determine the pressure command P(OFG) for the off-going clutching device according to the expression P(OFG) = P(OFG)*K, where $K_1$ is a constant, and $K = K - K_1$. Until the count t in the D PHASE TIMER exceeds $t_{del}$, the execution of instruction block 522 is skipped, as indicated by the flow diagram line 524.

So long as the "D" flag is set, the decision block 526 of the shift phase establishing routine of FIG. 10 is executed to determine if the on-coming clutching device is fully engaged. This may be determined by comparing the pressure command P(ONC) with the scheduled final pressure $P_f$. Once the on-coming clutching device is fully engaged, the instruction block 528 is executed to reset the "A", "B", "C", and "D" flags, completing the power-on downshift routine.

While this invention has been described herein in reference to the illustrated embodiment, it will be understood that various modifications will occur to those skilled in the art and that systems incorporating such modifications may fall within the scope of this invention, which is defined by the appended claims.

The embodiments of the invention in which an exclusive property or privilege is claimed are defined as follows:

1. In a motor vehicle including an engine connected to drive the vehicle through an automatic transmission, where the engine develops output torque in relation to operator demand and the transmission includes a fluid operated torque establishing device associated with each of an upper and a lower speed ratio mechanism, which devices are selectively engageable to transmit engine torque through their respective speed ratio mechanisms, a method of operating the torque establishing devices so as to downshift the transmission from the upper speed ratio to the lower speed ratio when the downshift is needed to satisfy operator demand, said method comprising the steps of:

progressively reducing the fluid pressure supplied to the torque establishing device associated with the upper speed ratio, thereby allowing the engine to increase the transmission input speed;

increasing the fluid pressure supplied to the torque establishing device associated with the upper speed ratio to a holding value when the transmission input speed increases substantially to a target speed corresponding to the transmission input speed that would be in effect if the torque establishing device associated with the lower speed ratio were engaged, the holding value being scheduled to hold the transmission input speed substantially at said target speed; and progressively engaging and disengaging the torque establishing devices associated with the lower and upper speed ratio mechanisms, respectively, thereby to complete the downshift.

2. In a motor vehicle including an engine connected to drive the vehicle through an automatic transmission, where the engine develops output torque in relation to operator demand and the transmission includes a fluid operated torque establishing device associated with each of an upper and a lower speed ratio mechanism, which devices are selectively engageable to transmit engine torque through their respective speed ratio mechanisms, a method of operating the torque establishing devices so as to downshift the transmission from the upper speed ratio to the lower speed ratio when the downshift is needed to satisfy operator demand, said method comprising the steps of:

initiating a first mode of operation (A) for progressively reducing the fluid pressure supplied to the torque establishing device associated with the upper speed ratio when it is determined that a downshift from said upper speed ratio to the lower speed ratio is needed to satisfy operator demand, thereby allowing the engine to effect a progressive increase in the transmission input speed;

initiating a second mode of operation (B) for stopping the reduction of fluid pressure effected during said first mode when such reduction results in a significant increase in the transmission input speed, thereby allowing the transmission input speed to continue its progressive rate of increase;

initiating a third mode of operation (C) for increasing the fluid pressure supplied to the torque establishing device associated with the upper speed ratio to a holding value when the transmission input speed has been increased substantially to a target speed corresponding to the transmission input speed that would be in effect if the torque establishing device associated with the lower speed ratio were engaged, the holding value being such that the transmission input speed is held substantially constant at a value determined in relation to said target speed; and initiating a fourth mode of operation (D) for progressively increasing and decreasing the fluid pressure supplied to the torque establishing devices associated with the lower and upper speed ratio mechanisms, respectively after the transmission input speed has been held at the target speed related value for at least a predetermined time, thereby to complete the downshift by progressively engaging the lower speed ratio torque establishing device and disengaging the upper speed ratio torque establishing device.

3. The method set forth in claim 2, including the steps of:

monitoring the change in transmission input speed during the first mode of operation (A), and comparing such change to a first reference value indicative of a significant amount of slippage across the torque establishing device associated with the upper speed ratio; and initiating said second mode of operation (B) when the monitored speed change exceeds the first reference value.

4. The method set forth in claim 3, including the step of:

scheduling said first reference value as a function of the transmission input speed, the first reference value increasing with increasing transmission input speed so as to effect an increase in the rate of change of transmission input speed during the second mode of operation (B), thereby to reduce the downshift time during relatively high speed operation.

5. The method set forth in claim 2, including the steps of:

monitoring the transmission input speed relative to said target speed during the second mode of operation (B), and comparing the difference therebetween with a second reference value indicative of a predetermined amount of slippage across the torque establishing device associated with the lower speed ratio; and initiating said third mode of operation (C) when said comparison indicates that the slippage across said torque establishing device is less than said predetermined amount.

6. The method set forth in claim 5, including the step of:

scheduling said second reference value as a function of the transmission input speed, the second reference value increasing with increasing transmission input speed so as to cause the third mode of operation (C) to be initiated earlier than would otherwise occur, thereby to reduce the downshift time during relatively high speed operation.

7. The method set forth in claim 2, including the steps of:

determining an engine torque related variable during the course of said downshift;

reducing the fluid pressure supplied to the torque establishing device associated with the upper speed ratio during the first mode of operation (A) in accordance with a pressure command; previously determined and stored as a combined function of time and said torque variable; and freezing the time dependency of said pressure command at the initiation of said second mode of operation (B), whereafter the pressure command retains its torque variable dependency, and results in a oontrolled increase of the transmission input speed during the second mode of operation (B).

8. The method set forth in claim 2, including the steps of:

controlling the fluid pressure supplied to the torque establishing device associated with the upper speed ratio during the third mode of operation (A) in accordance with a pressure command determined as a combined function of (1) an empirically derived and stored open loop pressure term, and (2) a closed loop pressure term determined in relation to the deviation between a reference difference and the actual difference between the transmission input speed and the target speed, thereby to maintain a predetermined relation to the target speed and the transmission input speed during the third mode of operation (C) despite speed disturbances which occur therein.

9. The method set forth in claim 8, including the steps of:
   determining the pressure command during the third mode of operation (C) as an additional function of an adaptive pressure term; and
   periodically updating the value of said adaptive pressure term following the initiation of the third mode of operation of a downshift in accordance with the difference between the transmission input speed and the target speed at the initiation of the fourth mode of operation, thereby to compensate for changing conditions which affect the accuracy of the pressure command.

10. The method set forth in claim 2, wherein the engagement of the torque establishing device associated with the lower speed ratio includes a fill phase during which fluid is supplied to the torque establishing device for a predetermined fill time to prepare it for engagement, and a completion phase during which the fluid pressure supplied to the device is progressively increased to complete the engagement thereof, and the method includes the steps of:
   comparing the time difference between the predetermined fill time of the torque establishing device association with the lower speed ratio and the predetermined fill time of the torque establishing device association with the lower speed ratio and the predetermined hold time for which the transmission input speed is held in relation to the target speed in the third mode of operation (C); and
   initiating the fill phase of the torque establishing device associated with the lower speed ratio in relation to said comparison such that the end of the fill phase coincides with the end of the predetermined hold time, whereby the torque establishing device associated with the lower speed ratio is prepared for engagement at the initiation of the fourth mode of operation (D).

11. The method set forth in claim 2, including the steps of:
   timing the duration of the first mode of operation (A); and
   overriding the second, third, and fourth modes of operation (B), (C), and (D), and forcing completion of the downshift if the timed duration exceeds a reference duration.

12. The method set forth in claim 2, including the steps of:
   sensing the rate of change in transmission input speed during the second mode of operation (B) relative to a relatively low reference rate of change; and
   decreasing the fluid pressure supplied to the torque establishing device associated with the upper speed ratio so long as the sensed rate is less than the relatively low reference rate to thereby force the progression of the downshift.

* * * * *